(12) United States Patent
Panjer

(10) Patent No.: US 12,371,165 B2
(45) Date of Patent: Jul. 29, 2025

(54) INTEGRATED DOOR LOCK FOR AN AIRCRAFT GALLEY CONTAINER

(71) Applicant: B/E Aerospace, Inc., Winston Salem, NC (US)

(72) Inventor: Frederik Adrian Stephan Panjer, Maarsbergen (NL)

(73) Assignee: B/E Aerospace, Inc., Winston Salem, NC (US)

( * ) Notice: Subject to any disclaimer, the term of this patent is extended or adjusted under 35 U.S.C. 154(b) by 179 days.

(21) Appl. No.: 18/304,276

(22) Filed: Apr. 20, 2023

(65) Prior Publication Data

US 2023/0399875 A1    Dec. 14, 2023

(30) Foreign Application Priority Data

Jun. 9, 2022    (EP) .................................... 22178257

(51) Int. Cl.
*E05B 9/00*    (2006.01)
*B64D 11/04*    (2006.01)
(Continued)

(52) U.S. Cl.
CPC .............. *B64D 11/04* (2013.01); *E05B 47/00* (2013.01); *E05B 65/0042* (2013.01);
(Continued)

(58) Field of Classification Search
CPC ..... B64D 11/04; E05B 47/00; E05B 65/0042; E05B 65/005; E05B 77/54; E05B 83/28; E05B 85/22; E05B 2047/0054; E05B 2047/0067; E05B 65/006; E05B 63/0004; E05B 63/14; E05B 63/143; E05B 9/008; E05C 9/045; E05C 9/042; E05C 9/00; E05C 9/002; E05C 9/006; E05C 9/04;
(Continued)

(56) References Cited

U.S. PATENT DOCUMENTS 4,892,338 A    1/1990    Weinerman et al.
6,357,806 B1    3/2002    Saku
(Continued)

FOREIGN PATENT DOCUMENTS

EP    1983131 A2 *  10/2008    ............... E05B 5/00
EP    3878747         9/2021

OTHER PUBLICATIONS

European Patent Office, European Search Report dated Nov. 14, 2022 in Application No. 22178257.6.

*Primary Examiner* — Suzanne L Barrett
(74) *Attorney, Agent, or Firm* — SNELL & WILMER L.L.P.

(57) ABSTRACT

There is provided herein an aircraft galley container including a door, a latch mechanism, and a lock. The latch mechanism is positionable in a latched position preventing opening of the door and an unlatched position permitting opening of the door. The latch mechanism includes a handle, a pair of rods and a rotatable plate. The rotatable plate is coupled to the handle and configured to be rotated by the handle and to convert rotational movement of the handle to linear movement of the pair of rods to place the latch mechanism in the latched and unlatched positions. The lock is configured to selectively prevent the rotatable plate from rotation to maintain the latch mechanism in the latched position.

12 Claims, 8 Drawing Sheets

(51) Int. Cl.
  *E05B 47/00* (2006.01)
  *E05B 65/00* (2006.01)
  *E05B 77/54* (2014.01)
  *E05B 83/28* (2014.01)
  *E05B 85/22* (2014.01)
  *E05C 9/04* (2006.01)

(52) U.S. Cl.
  CPC ............ *E05B 65/005* (2013.01); *E05B 77/54* (2013.01); *E05B 83/28* (2013.01); *E05B 85/22* (2013.01); *E05C 9/045* (2013.01); *E05B 2047/0054* (2013.01); *E05B 2047/0067* (2013.01)

(58) Field of Classification Search
  CPC . E05C 9/043; E05C 9/048; E05C 9/10; E05C 9/14; E05C 9/16; E05C 9/1858; E05C 9/20; E05C 9/22; Y10T 292/08; Y10T 292/0801; Y10T 292/0834; Y10T 292/0836; Y10T 292/0837; Y10T 292/0838; Y10T 292/0839; Y10T 292/084; Y10T 292/0844
  USPC .......................................................... 70/82
  See application file for complete search history.

(56) References Cited

U.S. PATENT DOCUMENTS

| | | | |
|---|---|---|---|
| 6,490,895 | B1 | 12/2002 | Weinerman et al. |
| 10,669,754 | B2 | 6/2020 | Lizotte |
| 10,906,458 | B2 * | 2/2021 | Simms ................... B60Q 3/30 |
| 11,015,817 | B2 | 5/2021 | Klok et al. |
| 11,254,442 | B2 * | 2/2022 | Chengalva ............. B64D 45/00 |
| 2004/0119592 | A1 * | 6/2004 | Hahn ................ H01L 21/67363 292/68 |
| 2007/0200368 | A1 * | 8/2007 | Bauer ..................... E05B 83/12 292/336.3 |
| 2008/0071398 | A1 * | 3/2008 | Kneller ................ B64D 11/003 700/83 |
| 2009/0242699 | A1 * | 10/2009 | Wentland ............... B64D 11/04 49/70 |
| 2009/0245981 | A1 * | 10/2009 | Miyajima ......... H01L 21/67373 220/377 |
| 2011/0126598 | A1 * | 6/2011 | Bacon .................... E05B 85/22 70/77 |
| 2018/0051502 | A1 * | 2/2018 | Roos ....................... E05B 81/20 |
| 2019/0017301 | A1 * | 1/2019 | Cumbo .................. E05B 85/26 |
| 2021/0285268 | A1 | 9/2021 | Panjer |
| 2022/0251888 | A1 * | 8/2022 | Scelzi .................... E05C 9/002 |

* cited by examiner

Fig. 2A
Fig. 2B
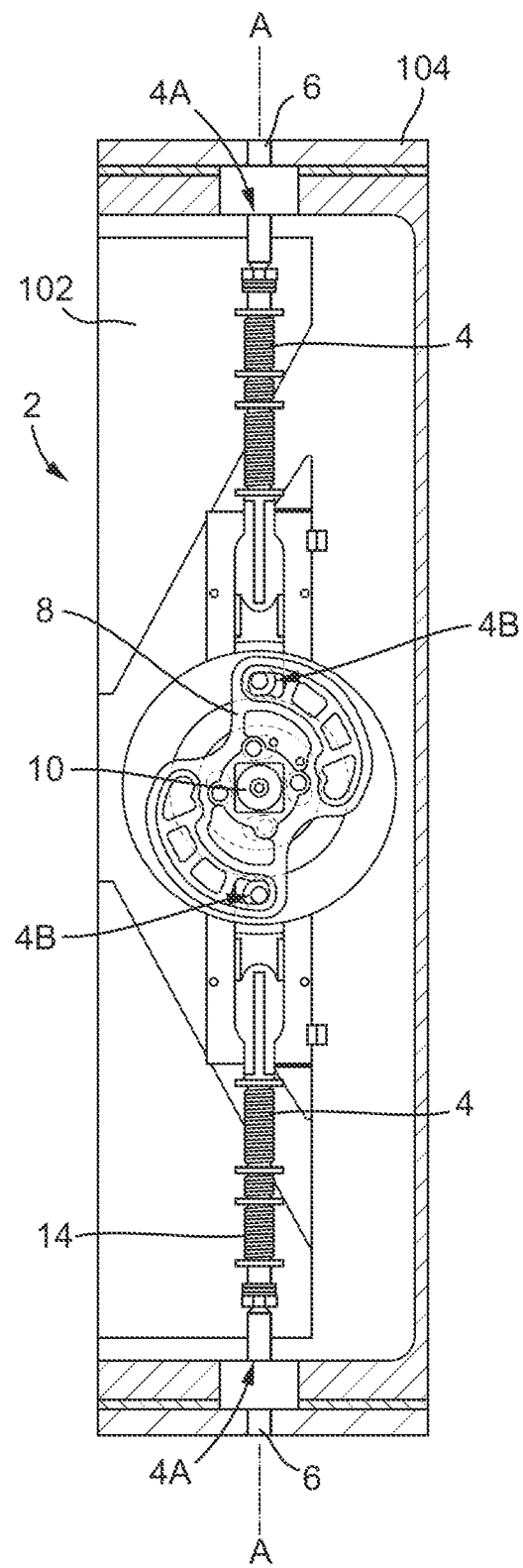
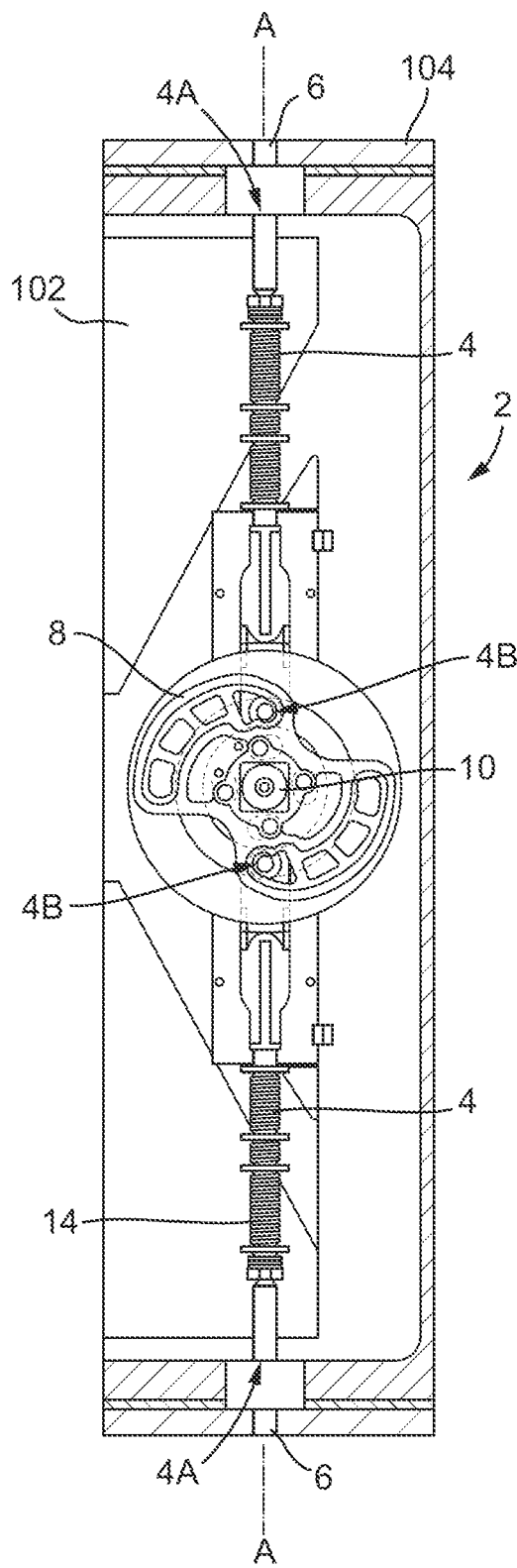

INTEGRATED DOOR LOCK FOR AN AIRCRAFT GALLEY CONTAINER

CROSS-REFERENCE TO RELATED APPLICATIONS

This application claims priority to, and the benefit of, EP Patent Application No. 22178257.6, filed Jun. 9, 2022 and titled INTEGRATED DOOR LOCK FOR AN AIRCRAFT GALLEY CONTAINER," which is incorporated by reference herein in its entirety for all purposes.

FIELD

The present disclosure relates to an integrated door lock for an aircraft galley container (or aircraft galley insert) for example an aircraft galley fridge.

BACKGROUND

Aircraft galley containers, or aircraft galley inserts, sometimes need the option to be locked. This is the case, for example, for aircraft galley refrigerators (or fridges) being used to store alcoholic beverages, when airlines fly to destinations having particular restrictions on alcohol. Similarly, locks may be used on aircraft galley containers (e.g., fridges) to prevent theft of valuable products stored within the aircraft galley containers.

Some previous arrangements to provide such a locking function include external lugs being attached to a door and a housing respectively of an aircraft galley container. These external lugs have aligned apertures configured to be used with a padlock or similar external locking device. These lugs, by extending outwards of the aircraft galley container give rise to potential hazards to the aircraft crew within the aircraft cabin, for example, during taxi, take-off, turbulence or landing of the aircraft, as well as in use of the aircraft galley container. Additionally, the external lugs could be broken off from outside the aircraft galley container, weakening the security of the lock.

There is a desire to provide an improved aircraft galley container having a secure locking function that does not give rise to said hazards.

SUMMARY

From a first aspect, there is provided an aircraft galley container including a door, a latch mechanism, and a lock. The latch mechanism is positionable in a latched position preventing opening of the door and an unlatched position permitting opening of the door. The latch mechanism includes a handle, a pair of rods and a rotatable plate. The rotatable plate is coupled to the handle and configured to be rotated by the handle and to convert rotational movement of the handle to linear movement of the pair of rods to place the latch mechanism in the latched and unlatched positions. The lock is configured to selectively prevent the rotatable plate from rotation to maintain the latch mechanism in the latched position.

The aircraft galley container may be a refrigerator.

The lock may include a rotatable locking member rotatable between a locking position and an open position.

The locking position may be disposed at 90° from the open position.

The lock may include a linearly translatable locking member translatable between a locking position and an open position.

The rotatable plate may include a recess, wherein the locking member is disposed within the recess when in the locking position and is displaced from the recess when in the open position.

The recess may be a slot disposed between front and back surfaces of the rotatable plate.

Alternatively, the recess may be a through hole. The through hole may extend from an outer periphery of the rotatable plate to a track of the plate for engaging the rod.

Alternatively, the recess may extend across the entire thickness of the rotatable plate.

The locking member may be configured to abut a side edge of the rotatable plate when in the locking position The lock may be configured to be operated manually by use of a key.

The lock may be configured to be remotely operated.

The lock may be replaceably removable from the aircraft galley container.

The lock may include a lock housing and one or more fasteners disposed to attach the lock housing to the door.

The door may include a front panel including an aperture in which the lock housing is located and wherein the fasteners are disposed behind the front panel.

From another aspect, there is provided a system including a plurality the aircraft galley containers of any of the above, a control module and a processor. The control module is configured to display a lock status of each of the plurality of aircraft galley containers and to receive inputs from a user to selectively lock or unlock the lock of each aircraft galley container. The processor is configured to detect the lock status of each of the plurality of aircraft galley containers for display on the control module and configured to lock or unlock the lock of each aircraft galley container in response to the inputs from the user.

The system may be a system for use in an aircraft.

BRIEF DESCRIPTION OF THE DRAWINGS

Various embodiments of this disclosure will now be described by way of example only, with reference to the accompanying drawings in which:

FIGS. 2A and 2B illustrate the operation of a latch mechanism of an aircraft galley container;

DETAILED DESCRIPTION

Figure 1:
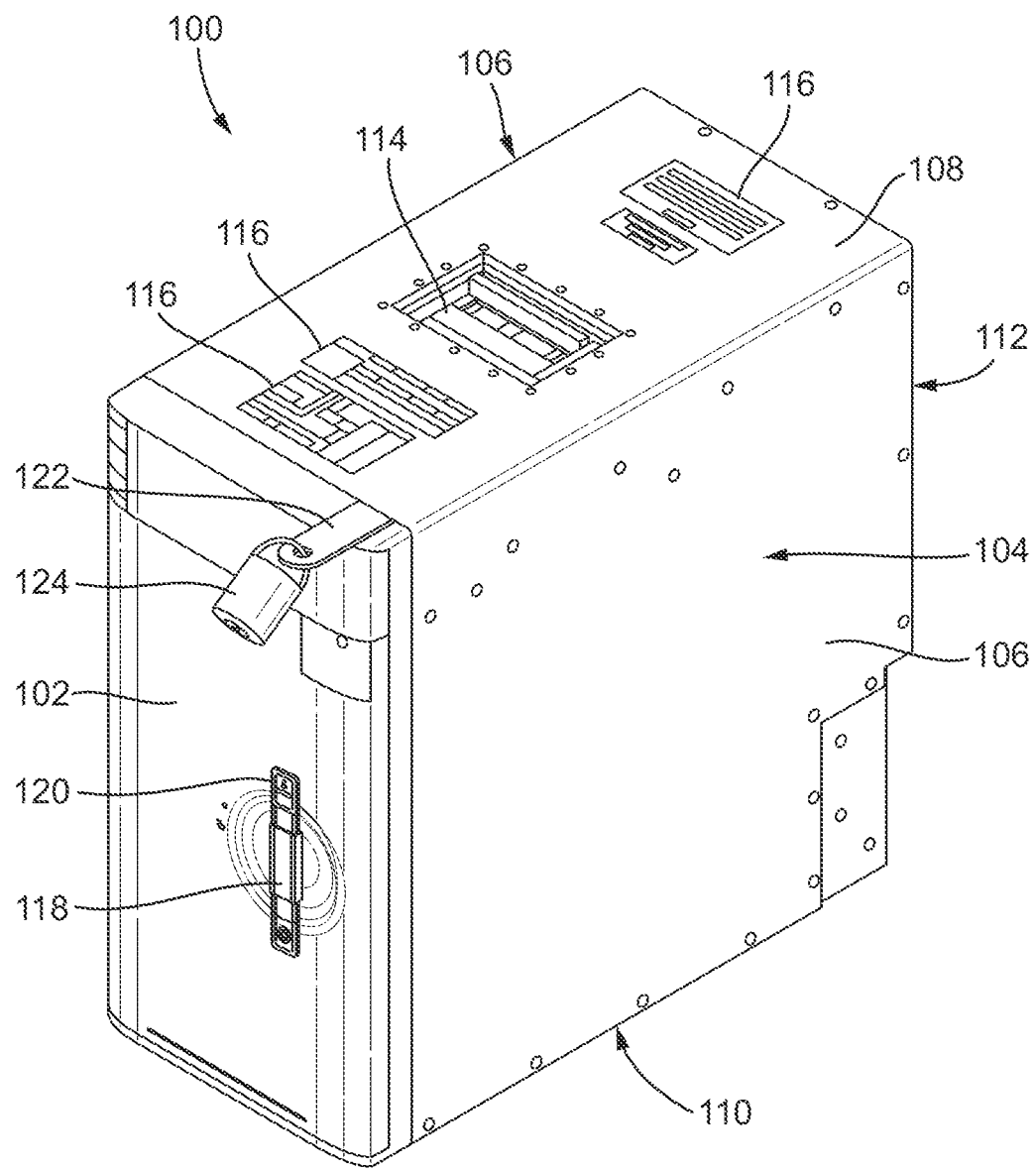
FIG. 1 illustrates a perspective view of a previous aircraft galley container.

With reference to FIG. 1, there is described a previous aircraft galley container 100. The illustrated aircraft galley container 100 is an aircraft galley refrigerator 100 (or an aircraft galley fridge). The aircraft galley container 100 has a door 102 hingedly attached to a storage compartment 104. The storage compartment 104 has side panels 106, a top panel 108, a bottom panel 110 and an aft panel 112. The storage compartment 104 is configured to house a variety of objects, such as alcoholic beverages. As will be appreciated the aircraft galley container 100 may also be used to store other items, such as food, jewelry, or other items sold on an aircraft.

The aircraft galley container 100 may include ancillary features, such as handle 114 or labelling features (labels) 116.

The door 102 has a handle 118, which is operable to selectively unlatch the door 102, by controlling a latch mechanism, as described below, so the container may be opened. The mechanism for unlatching, and latching the door is illustrated in FIGS. 2A and 2B.

The door 102 may also include a secondary latch mechanism (not illustrated) operated by a control 120, such as a button or a lever.

This previous aircraft galley container 100 includes a locking feature in the form of a pair of lugs 122 and a padlock 124. The lugs 122 are attached to the door 102 and the storage compartment 104 respectively, and are arranged such that apertures in each of the lugs 122 are aligned when the door 102 is closed. In the closed position, the padlock 124 is used to lock the door 102 by extending through the apertures in the lugs 122.

The present disclosure, as described below, includes an alternative locking feature to the pair of lugs 122 and padlock 124.

With reference to FIGS. 2A, 2B, 3, 3A and 3B the latch mechanism 2 (or primary latch mechanism) is described. The latch mechanism 2 shown herein is used in each of the aircraft galley container 100 of FIG. 1 and also the aircraft galley container of the disclosure described below with reference to FIGS. 4 to 10. As will be appreciated, the lock of the aircraft galley container of the disclosure is not shown in FIGS. 2A, 2B, 3, 3A and 3B.

The latch mechanism 2 is illustrated in a latched position in FIG. 2A and an unlatched position in FIG. 2B.

The latch mechanism 2 includes a pair of rods 4 having a first end 4A and a second end 4B. As will be appreciated the latch mechanism 2 could function with just a single rod 4, either the upper or lower rod as illustrated. However, a pair of rods 4 as illustrated provides the required strength of the latch mechanism 2 in aircraft galley containers. Each rod 4 is translatable along a rod axis A, which is upwards and downwards as shown in FIGS. 2A and 2B. As will be appreciated, the orientation of the rod axis A may be different to upwards and downwards and the reference to up and down is with respect to the aircraft galley container 100 in normal use.

The latch mechanism 2 includes a pair of holes 6, which may be blind holes, within the storage compartment 104 into which the first ends 4A of the rods 4 can extend. In the latched position (FIG. 2A), the first ends 4A of the rods 4 are located in the holes 6, and in the unlatched position, (FIG. 2B), the first ends 4A of the rods 4 are spaced from the holes 6. As will be appreciated, in the arrangement having only a single rod 4, only a single hole 6 is required. Additionally, grooves or slots could be used in place of the holes 6, provided that when the latch mechanism 2 is in the latched position, the rods 4 engage with the storage compartment 104 to prevent opening of the door 102. The illustrated holes 6 are in the top panel 108 and bottom panel 110 of the storage compartment 104 respectively. However, with an alternative design, the rods could be arranged to extend into and retract out of holes elsewhere in the storage compartment 104.

The latch mechanism 2 also includes a rotatable plate 8, operable to translate the rods 4. The rotatable plate 8 is shown in isolation in FIG. 3.

The rotatable plate 8 is fixed to the handle 118 by a fastener 10.

The rotatable plate 8 includes a pair of opposed tracks 12 (or there is only a single track when only a single rod 4) engaged with the second ends 4B of the rods 4, for example via a lug that may slide along the track 12. The opposed tracks 12 have a partial spiral shape in that they each include a primary radius R1 at a first end 12A of the track 12 and a secondary radius R2 at a second end 12B of the track 12, wherein the primary radius R1 is larger than the secondary radius R¬2.

When the handle 118 is rotated, the rotational movement is transferred to the rotatable plate 8. As illustrated, the rotatable plate 8 is rotated, upon rotation of the handle 118, in an anticlockwise direction from what is shown in FIG. 2A to what is shown in FIG. 2B.

The rods 4 are maintained in the rod axis A and only translate back and forth along the rod axis A. This means that at the rotatable plate 8 rotated, the second ends 4B of the rods 4 slide along the tracks 12 and are concurrently translated toward the middle of the rotatable plate 8 along the rod axis A.

This causes the first ends 4A of the rods 4 to retract from the holes 6, so as to move the latch mechanism 2 into the unlatched position.

When the rotatable plate 8 is rotated in a clockwise direction as shown, from FIG. 2B to FIG. 2A, the second ends 4B of the rods 4 slide back along the tracks 12 and thereby move to the secondary radius R2. As a result, the first ends 4A of the rods 4 extend into the holes 6, so as to move the latch mechanism 2 into the latched position.

As will be appreciated, the latch arrangement 2 will operate in a similar manner with only a single rod 4, a single hole 6, and a single track 12.

Similarly, the rotatable plate could have an alternative, for example reversed design, to cause the latch mechanism to move into the unlatched position under clockwise rotation and the latched position under anticlockwise rotation.

The illustrated latch mechanism 2 includes resilient members 14, for example, springs, arranged with the rods 4 and configured to bias the latch mechanism 2 into the latched position when the handle is not being moved or held in the position corresponding to the unlatched position or that shown in FIG. 2B.

Figure 3:
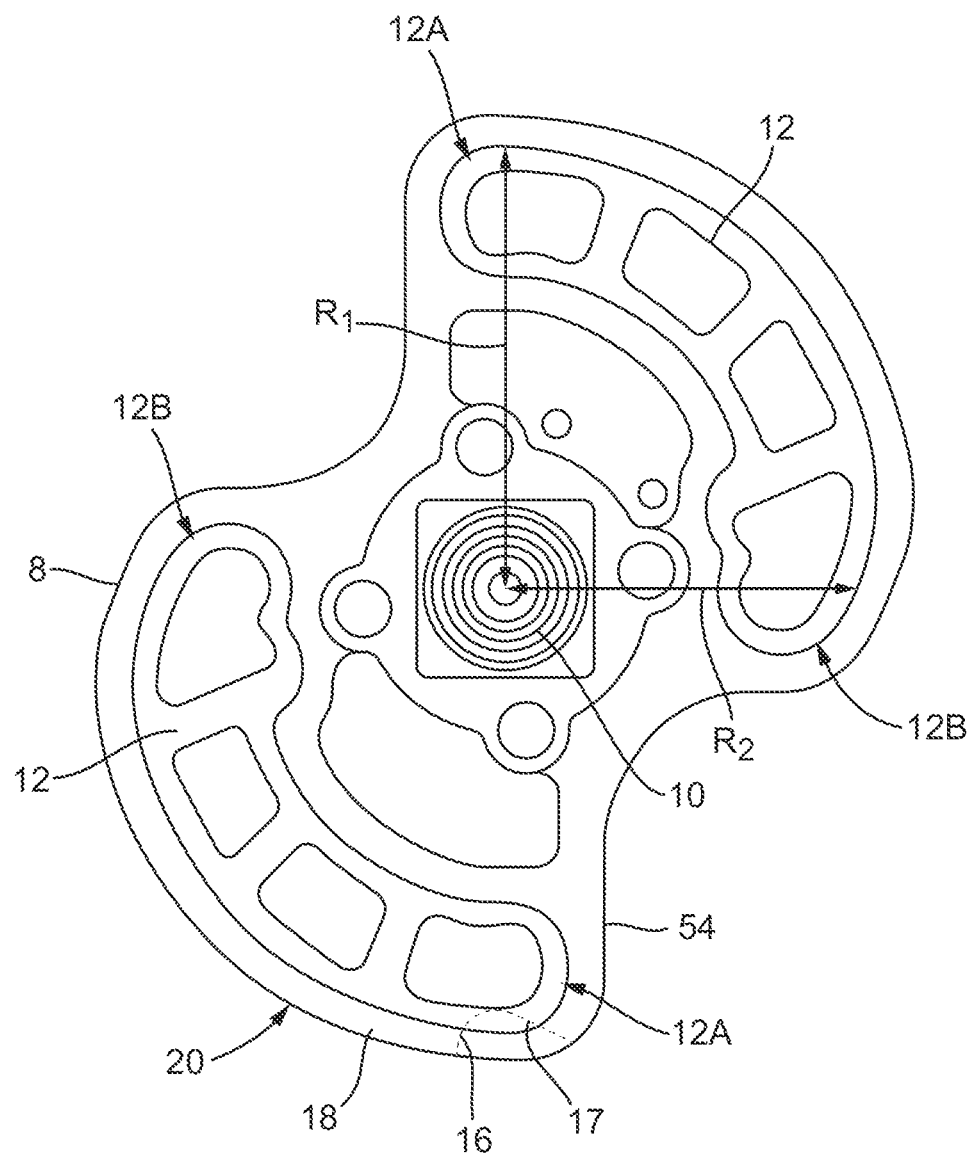
FIG. 3 illustrates a rotatable plate of the latch mechanism in isolation.
Figure 3A:
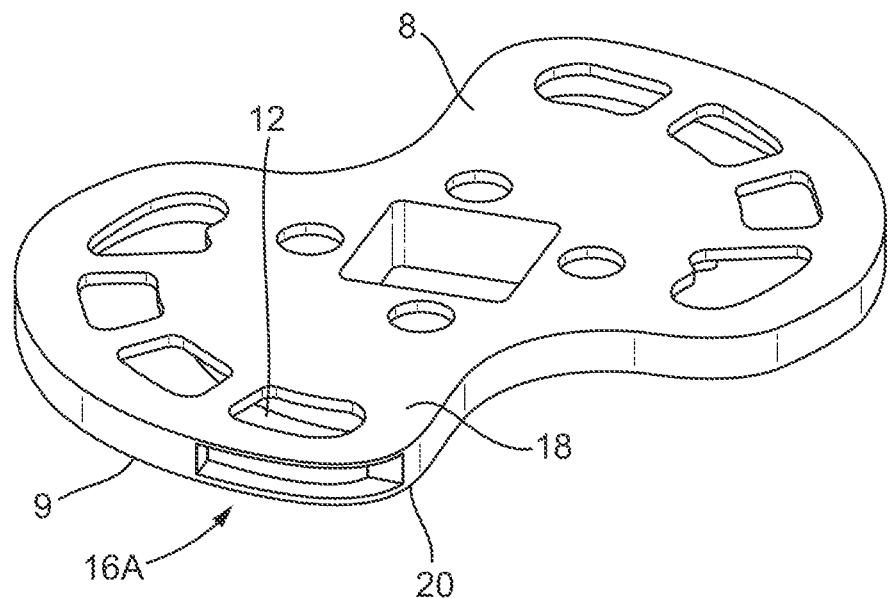
FIG. 3A illustrates another rotatable plate of the latch mechanism in isolation.
Figure 3B:
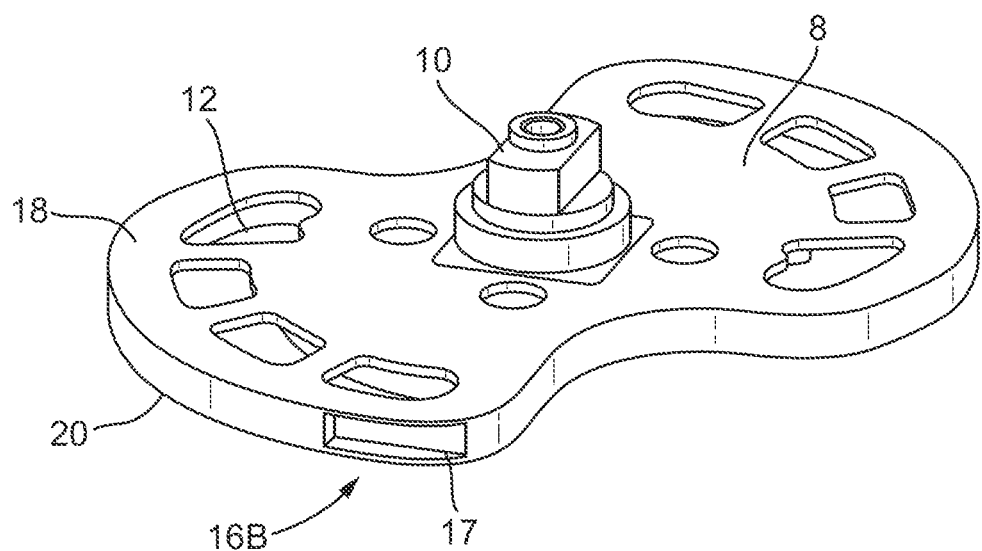
FIG. 3B illustrates yet another rotatable plate of the latch mechanism in isolation.

Also illustrated in the rotatable plate of FIG. 3, and also shown in FIGS. 3A and 3B is a recess 16, 16A, 16B, which may take the form of a slot or a through-hole disposed between front and back surfaces 18, 20 of the rotatable plate 8 or, alternatively may extend across the entire thickness of the rotatable plate 8. The form and function of the recess 16 in relation to the lock will be described further below.

With reference to FIGS. 4 to 10, an aircraft galley container 30 in accordance with the disclosure is described.

Figure 4:
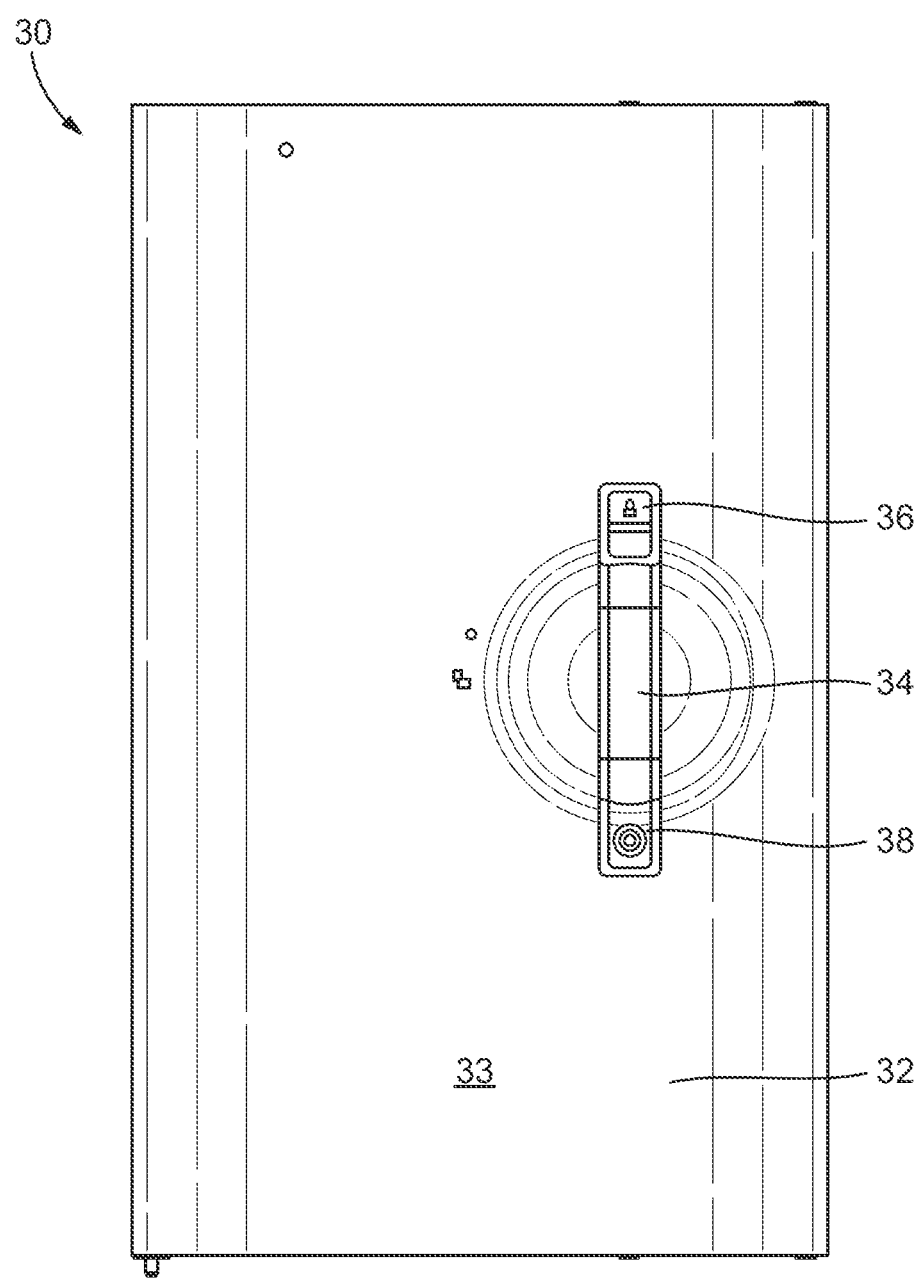
FIG. 4 illustrates a front view of an aircraft galley container in accordance with the disclosure.

Unless described otherwise, in particular with regard to the lock, the aircraft galley container 30 of FIG. 4 has the same features as the aircraft galley container 100 of FIG. 1.

Aircraft galley container 30 has a door 32 which is hingedly attached to a storage compartment and which has a front panel 33. The door 32 has a handle 34, which is configured to control a latch mechanism 2, as shown in FIGS. 2A, 2B and 3. The illustrated aircraft galley container 30 also includes a secondary latch mechanism 36, which is not described at length herein and is not required by the aircraft galley container 30. The secondary latch mechanism 36 includes a lever and a secondary rod, wherein the lever is actuated by a user to move the secondary rod into or out of a hole in the storage compartment to selectively prevent or allow opening of the door 32 respectively.

Aircraft galley container 30 includes a lock 38 integrated into the door 32, and as illustrated, adjacent the handle 34.

The lock 38 is configured to engage with the latch mechanism 2 to selectively allow or prevent movement of the latch mechanism 2 into the unlatched position.

Figure 5:
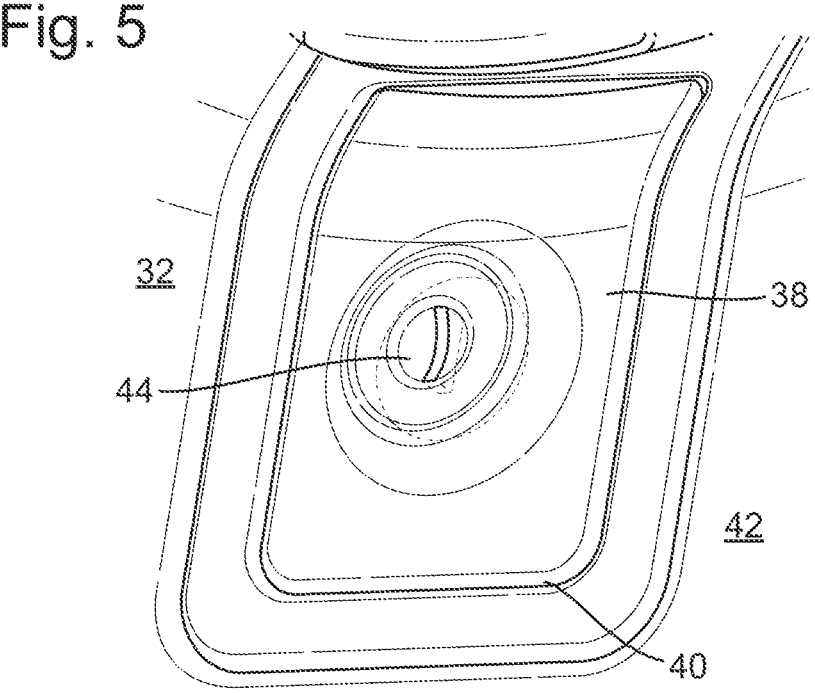
FIG. 5 illustrates a lock disposed in situ within a door of an aircraft galley container.

As shown in FIG. 5, the lock 38 is located within an aperture 40 located in a front panel of the door 32. The aperture 40, and thus, the location of the lock 38 may be adjacent the handle 34, as can be appreciated from FIG. 4.

The lock 38 as shown is configured to be operated manually, by use of a key. This is facilitated by the illustrated keyhole 44, which may take forms other than what is shown in FIG. 5. Alternatively, the lock 38 may be electronically operated, for example by use of stepper motors electrically connected to a controller, a control system, or a control module. The controller, control system or control module may be located remotely from the aircraft galley container 30, for example, in the aircraft cockpit or in the cabin. The controller, control system or control module may include a display indicating the locked or unlocked status of each lockable aircraft galley container 30 in an aircraft, and may also include a means for a user to provide an input to selectively place each of the lockable aircraft galley containers 30 into a locked or unlocked position as desired. The aircraft galley container 30 may include a sensor configured to detect when the door 32 is open or closed and to thereby inform the user by the display on the controller, control system or control module of the open or closed status of the door 32. When the door 32 is open, the lock 38 will not be operable to lock the door 32 in the closed position, so the user knows to only operate the lock 38 when the door 32 is closed, as indicated by the display, showing the output of the sensor.

Figure 6:
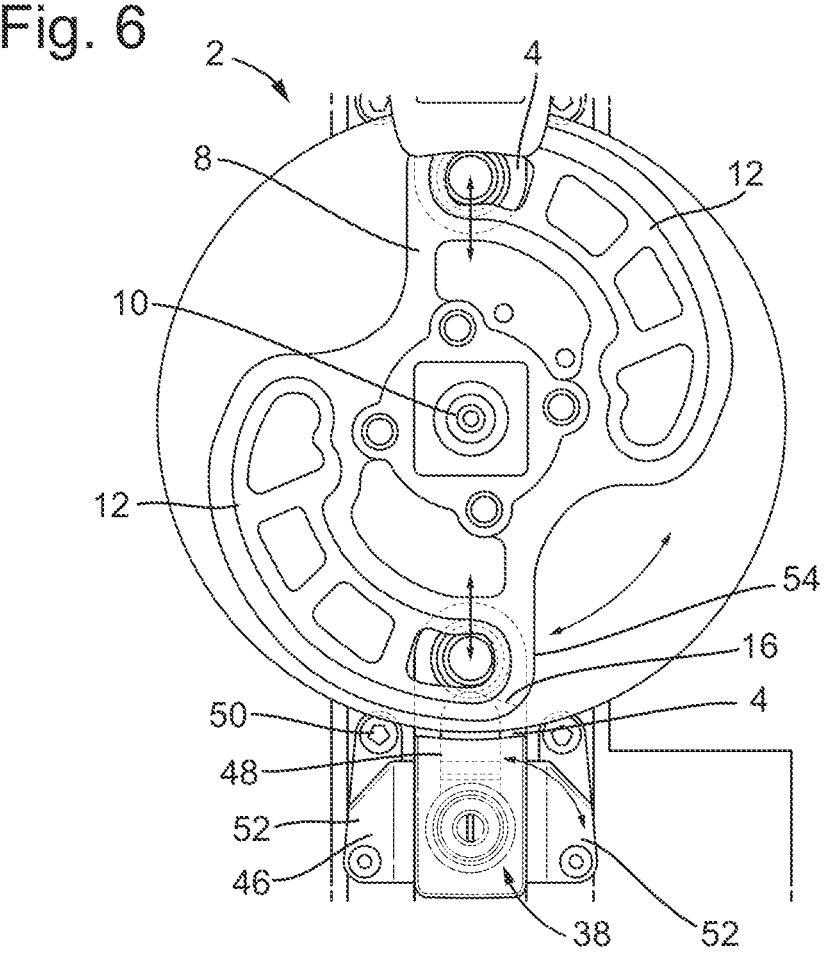
FIG. 6 illustrates a mechanism of a lock and a latch arrangement in accordance with the disclosure, with the lock in a locking position.

With reference to FIG. 6, which shows a view of the latch mechanism 2 and lock 38 from within the door 32, the operating mechanism of the lock 38 is described.

The lock 38 includes a lock housing 46 and a locking member 48. The lock housing 46 is held statically with respect to the door 32, for example by fasteners 50 which attach flanges 52 of the lock housing 46 to the door 32. The lock 38 may thereby be replaceably removable from the aircraft galley container 30. This allows the aircraft operator to select whether or not to use locks 38 on particular flights, and similarly to retrofit locks 38 of this type to existing aircraft galley containers, such as aircraft galley container 100.

Figure 7:
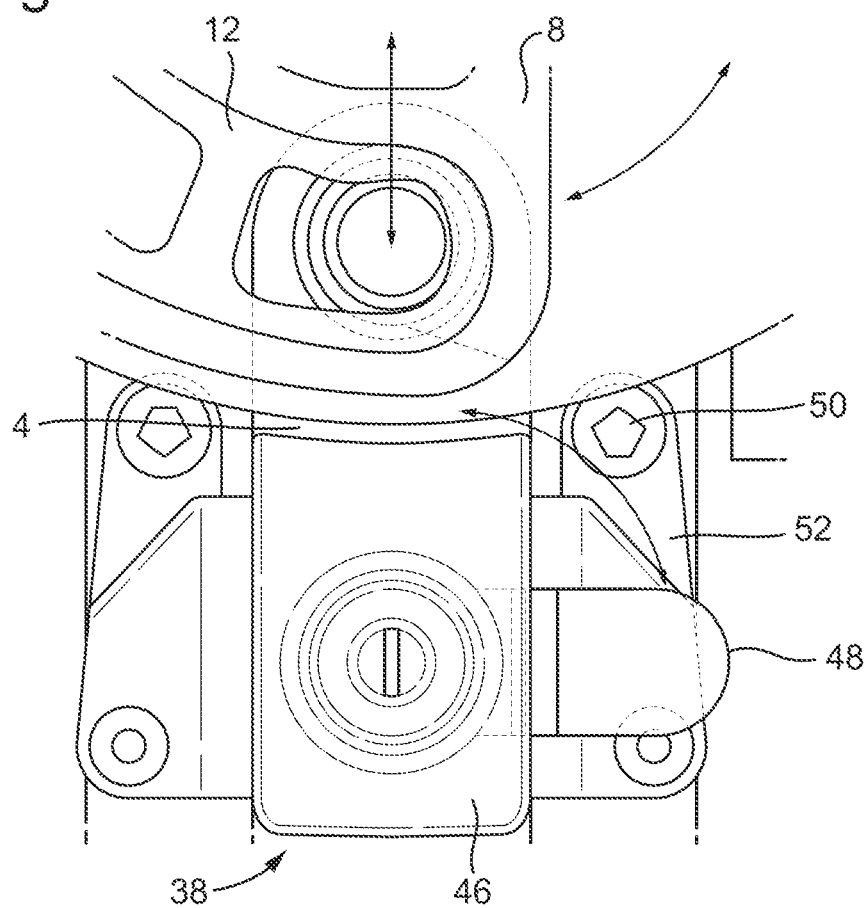
FIG. 7 illustrates a close up view of the lock in an open position.

The locking member 48 is moveable between a locking position (as shown in FIG. 6) and an open position (as shown in FIG. 7). In the illustrated arrangement, this movement is a rotational movement of about 90°; however, this could be a rotational movement of a different magnitude or a linear movement, with another type of lock. That is, in some arrangements, the lock includes a linearly translatable locking member translatable between a locking position and an open position.

The rotatable plate 8 includes a lock engagement feature which engages the locking member 48 when the locking member 48 is in the locked position, to prevent rotation of the rotatable plate 8 out of a position wherein the latch mechanism 2 is in the latched position. The illustrated lock engagement feature is a recess 16 shaped so as to conform to the locking member 48 in the locked position of the locking member 48. The recess 16 may take different forms, for example, those shown in FIGS. 3A and 3B. The recess 16 shown in FIG. 3A is a through hole 16A which extends from an outer periphery 9 of the rotatable plate 8 through to the track 12 which engages one of the rods 4 as described above. The recess 16 shown in FIG. 3B is a slot 16B that extends from the outer periphery 9 of the rotatable plate 8 towards the track 12, but does not extend all the way to the track 12. In this way, the slot 16B has an edge surface 17, which may be angled, as can be appreciated from FIG. 3, to allow movement of the locking member 48 into and out of the locked position. When the locking member 48 is within the slot 16B of FIG. 3B, the slot 16B surrounds the tip of the locking member 48 on every side except for the path which the locking member follows when inserted into the slot 16B.

Neither of the illustrated through hole 16A of FIG. 3A or slot 16B of FIG. 3B extend all the way to front or back surfaces 18, 20 of the rotatable plate. However, it will be appreciated that in some alternative arrangements, the recess 16 may extend across the entire thickness of the rotatable plate 8. When the recess 16 extends across the entire thickness of the rotatable plate 8, the recess 16 does not provide any structure directly forward or directly aft of the locking member 48. In alternative arrangements, the lock 38 may be positioned such that the locking member 48 engages with a side edge 54 of the rotatable plate 8, when in the locked position. In this way, the side edge 54 of the rotatable plate is the lock engagement feature. The side edge 54 is an edge of the rotatable plate 8 within a circular envelope of the rotatable plate 8 and which may be vertical when the rotatable plate 8 as shown in in the latched position. The side edge 54 is the edge of the rotatable plate 8 located in the direction in which the rotatable plate 8 would rotate when moving to the unlatched position.

As illustrated in FIG. 7, when the locking member 48 of the lock 38 is in the open position, the rotatable plate 8 is able to rotate and thereby to translate the rods (or rod) along the rod axis to thus move the latch mechanism 2 into the unlatched position.

Figure 8:
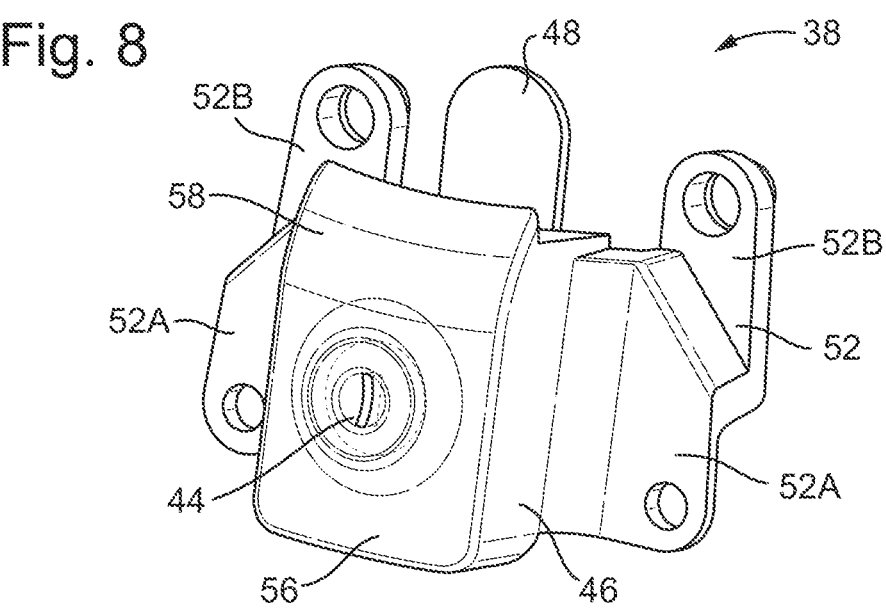
FIG. 8 illustrates the lock in isolation.

FIG. 8 shows the lock 38 in isolation. The illustrated lock 38 includes lock housing 46, and keyhole 44 attached to locking member 48. As discussed above, the lock housing 46 includes flanges 52 for attaching the lock housing 46 to the door 32 of the aircraft galley container 30. The flanges 52 may be set back from the front of the lock housing (46) so as to be fixable behind the front panel 33 of the door 32 of the aircraft galley container 30. In this way, the fasteners 50 are inaccessible, and also not visible from the front of the aircraft galley container 30. As such, they cannot be tampered with to circumvent the lock 38. Moreover, they do not present snagging hazards to the user.

The illustrated flanges 52 include forward flanges 52A and aft flanges 52B stepped from one another, which allows the flanges 52 to be fastened to different parts within the door 32.

The lock housing 46 includes a main body 56 which houses the key hole 44 and which, as illustrated includes a main body front panel 58 including a contoured or curved surface that conforms to the shape of the front panel 33 of the door 32 adjacent to the handle 34, where the lock 38 is positioned.

Figure 9:
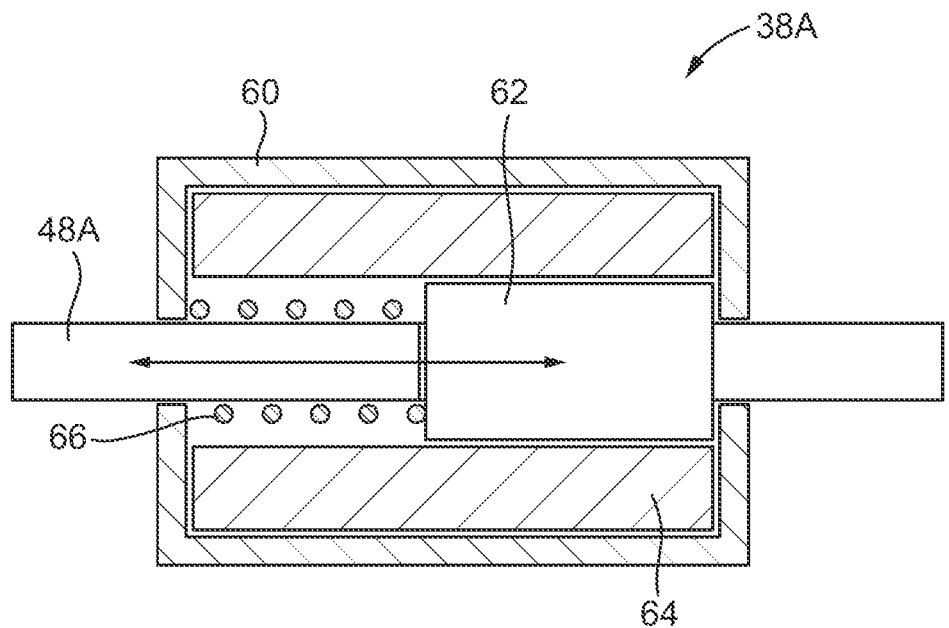
FIG. 9 illustrates another lock in isolation.

FIG. 9 illustrates an alternative lock 38A being in the form of an electronically controlled lock 38A. The electronically controlled lock 38A shown is a linear solenoid actuator, which includes a housing 60 a plunger 62, the plunger 62 being attached to the lock member 48A. Electromagnetic coils 64 are arranged around the plunger 62, which is ferromagnetic. Passing a current through the electromagnetic coils 64 induces an electromotive force which moves the plunger 62, and thus the lock member 48A. A resilient member 66, such as a spring may be included to provide a return force to move the plunger 62, and thus the lock member 48A, back to its original position. This is one example of a lock 38A that is operable remotely that could be used in the present disclosure. As will be appreciated, alternative arrangements, such as stepper motors could be used, and the motion of the lock member 48A could be either linear or rotational, depending on the particular arrangement used.

Figure 10:
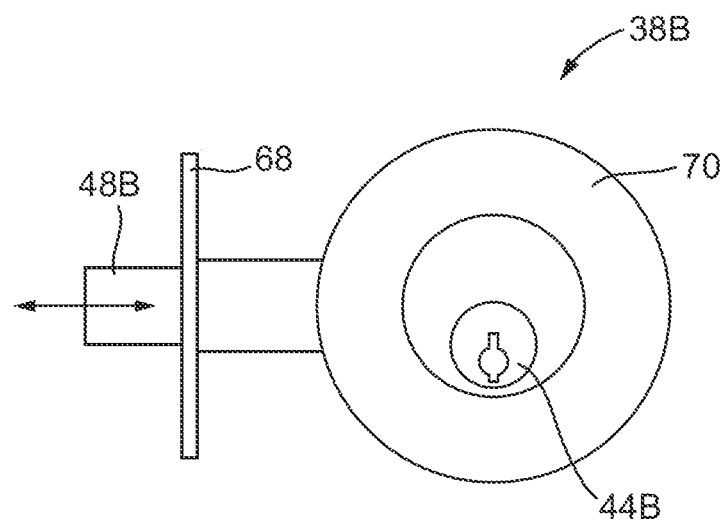
FIG. 10 illustrates yet another lock in isolation.

FIG. 10 illustrates an alternative lock 38B operable manually by the use of a key. The lock 38B is in the form of a deadbolt style lock and has a keyhole 44B, wherein turning of the keyhole 44B with a key results in linear movement of a locking member 48B. The lock 38B as illustrated includes a flange 68 and a lock housing 70, which, as will be appreciated, could be modified to appropriately fit the door panel 102 for attaching the lock 38B to the aircraft galley container 30.

What is claimed is:

1. An aircraft galley container comprising:
   a door;
   a latch mechanism, wherein the latch mechanism is positionable in a latched position preventing opening of the door and an unlatched position permitting opening of the door, wherein the latch mechanism includes:
      a handle;
      a pair of rods; and
      a rotatable plate coupled to the handle and configured to be rotated by the handle and to convert rotational movement of the handle to linear movement of the pair of rods to place the latch mechanism in the latched and unlatched positions; and
   a lock configured to selectively prevent the rotatable plate from rotation to maintain the latch mechanism in the latched position,
   wherein the lock includes a rotatable locking member rotatable between a locking position and an open position, and
   wherein the rotatable plate includes a recess, wherein the rotatable locking member is disposed within the recess when in the locking position and is displaced from the recess when in the open position.

2. The aircraft galley container of claim 1, wherein the aircraft galley container is a refrigerator.

3. The aircraft galley container of claim 1, wherein the locking position is disposed at 90° from the open position.

4. The aircraft galley container of claim 1, wherein the recess is a slot disposed between front and back surfaces of the rotatable plate.

5. The aircraft galley container of claim 1, wherein the recess is a through hole.

6. The aircraft galley container of claim 1, wherein the rotatable locking member is configured to abut a side edge of the rotatable plate when in the locking position.

7. The aircraft galley container of claim 1, wherein the lock is configured to be operated manually by use of a key.

8. The aircraft galley container of claim 1, wherein the lock is configured to be remotely operated.

9. The aircraft galley container of claim 1, wherein the lock is replaceably removable from the aircraft galley container.

10. The aircraft galley container of claim 9, wherein the lock comprises a lock housing and one or more fasteners disposed to attach the lock housing to the door.

11. The aircraft galley container of claim 10, wherein the door comprises a front panel including an aperture in which the lock housing is located and wherein the one or more fasteners are disposed behind the front panel.

12. A system comprising:
   a plurality of aircraft galley containers such as the aircraft galley container of claim 8;
   a control module configured to display a lock status of each of the plurality of aircraft galley containers and to receive inputs from a user to selectively lock or unlock the lock of each aircraft galley container; and
   a processor configured to detect the lock status of each of the plurality of aircraft galley containers for display on the control module and configured to lock or unlock the lock of each aircraft galley container in response to the inputs from the user.

* * * * *